…

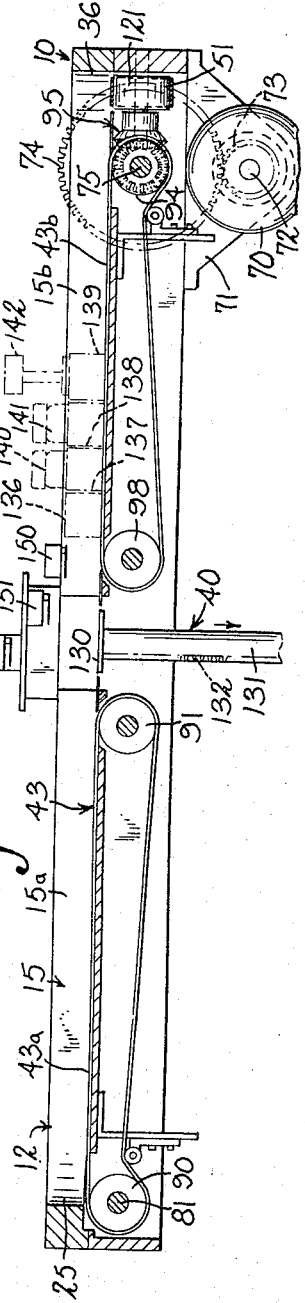

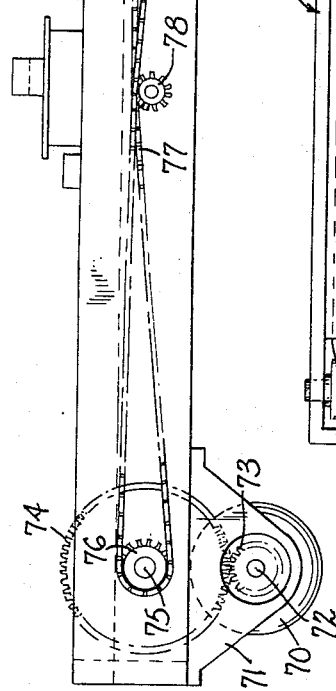

United States Patent Office 3,351,177
Patented Nov. 7, 1967

3,351,177
SAMPLE CONVEYOR
Robert J. Mulligan, Westport, Conn., assignor to Ans, Inc., Wallingford, Conn., a corporation of Connecticut
Filed Apr. 12, 1965, Ser. No. 447,456
3 Claims. (Cl. 198—40)

This invention relates to automatic equipment for conveying individual items and more particularly to an automatic device for guiding and conveying a plurality of individual material sample containers in a sequential manner to a utilization device. The invention as herein described is of unique utility in automatic equipment for exposing a plurality of liquid scintillation samples to measurement by exposure to highly sensitive photomultipliers.

In the making of scintillation measurements, the scintillating composition, wholly or partially liquid, is placed in bottles or vials. The bottles are then sequentially carried to an elevator arrangement where they are lowered into a light-tight compartment containing the photomultipliers in order to measure the radio-active induced light emitted from the scintillating composition.

Sample conveying systems of the prior art which have been adapted for use in scintillation systems, have included a wheel, a chain, a belt, or other means for moving a plurality of samples over a flat table surface. Additionally, some of the systems of the prior art have been adapted to handle anywhere from forty to three hundred and sixty samples sequentially. Systems with handling capacities of fewer than one hundred samples have usually been adjudged inadequate in view of the typical requirement of the user in terms of both number of samples and time of measurement. Although the prior art has offered systems which will accomplish the conveying of hundreds of samples, these have been rather complex and costly, particularly when adapted to a flat table surface.

Accordingly, a new and improved sample conveying system was required for utilization in scintillation counting apparatus. This new conveying system had to be simple in design, highly reliable and low in cost.

In view of the foregoing, an object of this invention is to provide a new and improved sample conveying system.

Another object of this invention is to provide a new and improved sample conveying system suitable for utilization in scintillation counting systems.

A further object of this invention is to provide a new and improved sample conveying system suitable for use in conjunction with flat table surfaces.

Still other objects of this invention will in part be obvious and will in part be apparent from the specification.

In accordance with this invention, a new and improved item conveying system is provided. In the preferred embodiment of this invention, a plurality of guideways are coupled in a back and forth or zig-zag fashion, e.g., sinuous or Z fashion. Additionally, selected portions of the guideways are constructed with a moving belt floor for conveying the samples or items through the guides. Furthermore, the belts in adjacent guideway portions are driven in preferably opposite directions in order to convey the items in the aforementioned path. As a further feature of the preferred embodiment, a single motor is utilized to drive two driveshafts to which the alternate belts are coupled in a manner to drive adjacent positioned belts in different directions.

For a fuller understanding of the nature and objects of the invention, reference should be had to the following detailed description taken in connection with the accompanying drawings, in which the same reference numerals designate like or corresponding parts in the several views and in which:

FIG. 1 is a top plan view of the sample conveyor according to this invention;

FIG. 2 is a sectional view taken along line 2—2 of FIG. 1;

FIG. 3 is a front elevational view of the sample conveyor according to this invention;

FIG. 4 is a bottom view of the sample conveyor according to this invention with the drive motor removed for the purpose of clarity; and FIG. 5 is a schematic diagram of a circuit responsive to the sensing of various sized items carried by the sample conveyor according to this invention.

Referring now to FIG. 1, there is shown a housing 10 having a table top portion 11, which table top portion is preferably flat so as to keep the liquid samples being conveyed on an even keel. Table top 11 includes a guideway generally shown at 12 comprising a plurality of guide elements 15 through 22. Guide elements 15 and 16 are coupled together by connecting guide element 25, guide elements 16 and 17 are coupled together by connecting guide element 26, guide elements 17 and 18 are coupled together by way of connecting guide element 27, guide elements 18 and 19 are coupled together by way of connecting guide elements 28, guide elements 19 and 20 are coupled together by connecting guide element 29, guide elements 20 and 21 are coupled together by connecting guide element 30, and guide elements 21 and 22 are coupled together by connecting guide element 31. In order to return the samples or items from the guide element 22 to guide element 15, a side guide element 35 is provided. Side guide element 35 is interconneced with guide element 15 by means of an end guide element 36 and is also interconnected with the guide element 22 by means of an end guide element 37. The previously-mentioned guide elements are interconnected in a manner adapted to guide sample holders with or without samples to an elevator assembly shown at 40. The elevator assembly 40 generally employs a multiplicity of mechanical light shutters or gates sequentially operated such that a sample may be conveyed into a light-tight portion of the scintillation counting apparatus in proximity to light responsive photomultiplier tubes without exposing the photomultiplier tubes to outside light. Additional elevator assemblies of the prior art scintillation counting systems have included an O-ring shutter assembly which accomplishes the same result.

In the preferred embodiment, guideways or guide elements 15 through 22 are preferably arranged such that a line extending substantially the length of the guide element and parallel thereto makes preferably an angle of less than 90° with a similar line running the length of and parallel to adjacent guide elements as, for example, guide elements 15 and 16. Additionally preferably, the arrangement of the entire guideway is in either a sinuous or zig-zag, e.g., Z configuration in toto and further preferably, as shown in FIG. 1, the adjacent guide elements 15–22 are substantially parallel to each other. The open guide elements 15–22 have positioned as a portion of the floor of the guide elements a plurality of belts 43–50. These belts are driven such that alternate belts are driven in opposite or different directions as, for example, belts 43, 45, 47 and 49 are driven in the one direction and belts 44, 46, 48 and 50 are driven in an opposite direction. Additionally, guide element 35 also has a belt element 51 forming a portion of the floor of the guide element. The belt 51 moves in a direction to return samples being conveyed on guide element 22 back to the guide element 43. It is to be noted that guideway element 15 is divided into halves 15a and 15b due to the position of elevator assembly 40. Accordingly, the belt 43 is also divided into belt halves 43a and 43b which are driven in the same direction. The directions of the various belts are as shown by the arrows of FIG. 1. There is also provided as a portion of the floor of the connecting guide elements 25–31, a plurality of six floor plates 60–66, respectively. These plates are positioned between the various belts in a manner to convey samples along the guideway path.

Referring now to FIGS. 2–4, there is disclosed the general arrangement of means for driving the various belts 43–50 respectively. To drive these various belts an electric motor 70 is provided which is supported by flange 71 extending from the housing 10. This motor has a rotating shaft 72 to which there is coupled gear 73 which meshes with and drives a second gear 74. This second gear is mounted on a shaft 75. The shaft 75 also has coupled thereto a sprocket gear 76 for driving a chain 77. The chain 77 is driven over a sprocket arrangement 78 to drive a sprocket gear 80 mounted on a shaft 81. The chain 77 is arranged over sprocket 78 such that gears 76 and 80 and the respective shafts 75 and 81 coupled to these gears are driven in opposite rotating directions.

In order to drive the two belt portions 43a and 43b in the same direction, belt portion 43a is driven from a drive pulley 90 which is affixed to shaft 81 by a set screw. Thus pulley 90 and shaft 81 will rotate in the same direction. The other end of belt portion 43a is coupled to an idler pulley 91 which is affixed to the underside of table 11. To drive belt portion 43b in the same direction as belt portion 43a, one end of belt portion 43b is driven from a drive pulley 94 which is coupled to a beveled gear arrangement 95 affixed by a set screw to the shaft 75. The beveled gear arrangement 95 reverses the direction of rotation of drive pulley 94 with respect to the direction of motion of shaft 75. Accordingly, the belt portion 43b will be driven in the same direction as belt portion 43a. The other end of the belt portion 43b is coupled to an idler pulley 98 which is affixed to the underside of table 11. To drive the remaining belts 44–50 in opposite directions, belt 44 is coupled to an idler pulley 100 freely mounted on shaft 81 and to a drive pulley 102 affixedly coupled to shaft 75 and belt 45 is coupled in like manner by way of a drive pulley 104 and an idler pulley 105. Additionally, belt 46 is also coupled in a like manner by a drive pulley 107 and an idler pulley 108. Further, belt 47 is coupled to drive pulley 110 and idler pulley 111, belt 48 is coupled to drive pulley 113 and idler pulley 114, belt 49 is coupled to drive pulley 116 and idler pulley 117 and belt 50 is coupled to drive pulley 118 and idler pulley 119. In this manner, adjacent belts 43–50 are driven in opposite directions, thereby causing items placed on the belts to move from the end of the table furthest from the elevator assembly to the elevator assembly. Also, belt 51 is driven via beveled gear assembly 95 by way of drive pulley 121 in a direction to return the items or containers from belt 50 to belt portion 43b. The other end of belt 51 is coupled to an idler pulley 123 which is affixed to the underside of table 11.

Referring again to FIG. 2 and additionally to the circuit diagram of FIG. 5 for a description of the operation of the elevator assembly and sensor switches according to this invention, the elevator assembly includes a platform 130 which is connected to a rod 131 having gear teeth 132. Platform 130 is lowered upon predetermined command signals to position a holder containing a sample container, in the light-tight compartment of a scintillator container, in proximity to the photomultiplier tubes of the scintillator. As shown in FIG. 2, there are positioned on the belt four holders 136–139. Positioned in holders 137 and 138 are two sample containers 140 and 141, and positioned in holder 139 is an irregularly shaped dummy or blank 142. To detect what is being carried on belt portion 43b, three switches 150, 151 and 152 are mounted on elevator assembly 40. Switch 150 is responsive only to the passage of the container holders 136–139, switch 151 is actuated only upon the sensing of a sample container, e.g. 140 or 141, and switch 152 is only actuated by the topmost irregularly shaped portion of dummy 142. In FIG. 5 there is shown the switches 150–152 in a circuit configuration. The circuit includes a source of voltage 160, a counter 161 which could be of the electromechanical type. Counter 161 counts each time a container holder 136–139 is detected as it passes switch position 150. This information is then generally utilized in the scintillation system along with the count information generated in the scintillation system to provide the reference of the sample which has been tested.

Only when switch 151 is closed by the passage of the sample container 140 or 141 will the elevator platform 130 be lowered with the container holder and the sample positioned thereon. This is accomplished by the energization of a motor 162 which drives a gear 163 coupled to the gear 132 mounted on rod 131. To keep the circuit energized, a relay coil 170 is provided to keep a parallel connected relay 171 in a closed position. To raise the elevator and the sample after the scintillation counting process is concluded, a separate motor may be utilized to raise the elevator and further means may be provided to disconnect the motor 162 during the raising of the elevator. These signals for raising the elevator are generally provided in a scintillation system by a controller after the time for counting the radiations from the scintillator sample has been concluded. Accordingly, they are not shown in the drawing of FIG. 5.

On the passage of the irregular shaped dummy or blank 142, switch 150 will be actuated and a count will be made, but due to the narrowness of its mid-section, blank 142 will not affect switch 151 and will only affect switch 152. The closing of switch 152 resets the counter so that the next container holder will be given the number 1 again. Thus, any new sample batch may be indexed beginning with any number desired.

It will thus be seen that the objects set forth above, among those made apparent from the preceding description, are efficiently obtained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In combination, a housing, an elevator means supported by said housing for carrying an item from a first raised position into the interior of said housing, a guide means for conveying items to and from said elevator in its raised position, a plurality of item holders positioned in said guide means, a plurality of samples positioned in at least some of said holders, at least one dummy positioned in at least one of said holders, a first sensor means positioned adjacent said elevator and said guide means and only responsive to the passage of said holders, a second sensor means positioned adjacent said elevator and said guide means and only responsive to the passage of said samples, a third sensor means positioned adjacent said elevator and said guide means and only responsive to the passage of said dummy, means for causing said elevator to position a sample in the interior of said housing in response to a signal from said second sensor, a counter means coupled to said first and third sensors, said first sensor providing a signal to cause said counter to determine the number of holders that have been sensed by said first sensor, and said third sensor providing a signal to cause said counter to be reset upon the sensing of a dummy by said third sensor.

2. A sample changing conveyor system comprising in combination, a housing, an elevator means supported by said housing for carrying an item from a first raised position into the interior of said housing, a guide means for conveying items to and from said elevator in its raised position, a plurality of item holders positioned in said guide means, a plurality of samples positioned in at least some of said holders, at least one dummy positioned in at least one of said holders, a first sensor means positioned adjacent said elevator and said guide means and only responsive to the passage of said holders, a second sensor means positioned adjacent said elevator and said guide means and only responsive to the passage of said samples, a third sensor means positioned adjacent said elevator and said guide means and only responsive to the passage of said dummy, means for causing said elevator to position a sample in the interior of said housing in response to a signal from said second sensor, a counter means coupled to said first and third sensors, said first sensor providing a signal to cause said counter to determine the number of holders that have been sensed by said first sensor, and said third sensor providing a signal to cause said counter to be reset upon the sensing of a dummy by said third sensor, said guide means including in combination, a plurality of guideways, each of said guideways positioned adjacent to at least one of the other of said guideways, means interconnecting at least some of the ends of adjacent guideways, each of said guideways having movable means for conveying items through said guideways, and means for moving adjacent guideway movable means in different directions with respect to each other and in a manner to sequentially convey items through said guideways, said last-mentioned means including a motor, a pair of drive shafts, means coupled to said motor for rotating said shafts in opposite directions, a plurality of drive pulleys and a plurality of idler pulleys positioned on each of said shafts, each of said movable means coupled to a drive pulley positioned on one of said shafts and to an idler pulley on the other one of said shafts.

3. A conveyor for use in a scintillating counting system to provide an item for placement on a platform so that it may be lowered into a counting system, said conveyor including one guideway having first and second belts with a platform positioned therebetween, means for driving said belts in the same direction, said last-mentioned means comprising a first shaft having a drive pulley thereon for moving said first belt, a second shaft, means for rotating said first and second shafts in opposite directions, a bevel gear arrangement secured to the second shaft, and a drive pulley driven by said bevel gear arrangement for driving the second belt in the same direction as the first belt.

References Cited

UNITED STATES PATENTS

| 1,172,921 | 2/1916 | Yost | 235—98 |
| 1,516,016 | 11/1924 | Kallenbach | 198—75 |
| 1,684,853 | 9/1928 | White | 198—85 X |
| 2,732,067 | 1/1956 | Cunningham | 198—39 X |
| 3,253,696 | 5/1966 | Szatkowski | 198—102 |

FOREIGN PATENTS

| 665,605 | 6/1963 | Canada. |
| 80,626 | 8/1952 | Norway. |

EVON C. BLUNK, *Primary Examiner.*

EDWARD A. SROKA, *Examiner.*